Patented Apr. 2, 1929.

1,707,465

UNITED STATES PATENT OFFICE.

WILLIAM HUNTER VOLCK, OF WATSONVILLE, CALIFORNIA, ASSIGNOR TO CALIFORNIA SPRAY-CHEMICAL COMPANY, OF WATSONVILLE, CALIFORNIA, A CORPORATION OF CALIFORNIA.

INSECTICIDE AND PROCESS OF MAKING AND USING THE SAME TO PROTECT PLANTS.

No Drawing. Application filed June 17, 1924. Serial No. 720,508.

The invention relates to insecticides for controlling insects on plants and trees, and to processes of preparing, combining and using such insecticides.

One object of the invention is to provide an insecticide which can be applied in liquid form that will kill scale insects, insect eggs and other forms of insect life with a practical degree of certainty without likelihood of injury to the tree or plant owing to variations of amount applied, changes in weather conditions, or physiological conditions of the plant.

Another object of the invention is to provide an insecticide in fluid form which may be effectively used to control insect life on growing citrus trees, for example by spraying, without substantial injury even to such sensitive foliage.

Another object of the invention is to provide an insecticide consisting of suitably emulsified oil of special character which may safely be used in such high concentration as to insure killing insects, without damaging the tree or plant.

Another object of the invention is to provide an insecticide which may be applied in fluid form and yet which will remain in place for a long enough period to permit it to prove fatal to a sufficient variety of insect life to enable a single application in spring or summer to control damage by certain insects throughout the year.

Other objects of the invention will appear hereinafter, such, for example, as providing a liquid spay medium fatal to sucking insects and chemically inert but physically attractive to suspended particles so that it may be compatible for use with the materials usually applied as poisonous insecticides to chewing insects and with other economic poisons.

One advantage of my invention is that it enables me to actually tonic or stimulate the plant under many conditions by use of the proper kind of oil. For example, I have taken two trees, both substantially free from parasites, and applied my new spray mixture to one of these but not to the other. The one which had been sprayed clearly showed enhanced vigor, better foliage-color, more luxuriant growth, and this tonic effect lasted for months. I have proved a similar tonic effect in another way by taking two halves of an orchard and fumigating one of them, while using my new spray on the other, and completely killing the insects on both; but exhibiting a notably more vigorous half where the spray had been used.

The invention possesses other advantageous features, some of which will be set forth at length in the following description, where I shall outline in detail certain specific forms of my invention. It is to be understood, however, that the invention is not limited to such forms, and that the invention as set forth in one or more of the claims, may be embodied in a plurality and variety of forms.

Emulsified oils of certain kinds, including mineral oil (petroleum) and various volatile portions or fractions thereof, as well as animal and vegetable oils have long been used with some advantage as insecticides for certain kinds of insects on both dormant and growing plants under limited conditions. Oil emulsions can probably be made to kill all forms of insect life provided the concentration of the active ingredient is sufficient to saturate the insect's body, the egg mass, or other forms of insect life to which the application is made and provided the application is long enough continued. However, there has hitherto been great risk of injury to the plant, particularly if effective insecticidal concentrations of oil in the emulsion were used. The permissible concentration of any oil emulsion is determined by the toleration of the plant to which the application is made. Dormant plants, such as deciduous trees in the winter season, have a comparatively high resistance to oil injury and it is not difficult to prepare an emulsion of the oils hitherto used, such for example as stove distillate, which by sufficient application will kill scale insects, insect eggs and other forms of insect life attached to such trees, without injury to the tree provided suitable kinds of emulsions are employed, provided the plant is not too dry and provided no unexpected change of weather occurs.

On the other hand, when it is desired to proceed with certainty and safety, i. e. to apply sufficient concentrations to insure insect killing without risk of damage to the plant, and more specifically to combat insects on growing plants and on trees which are never dormant, or which have variable or short dormant periods, such as various citrus varieties, entirely different problems are presented which have engaged the attention of chemists and entomologists for years without solution. In such cases the toleration of the plant has hitherto compelled the use of such ineffective oils, or else such low concentrations of the oils in the emulsion, that the control of insects has been inefficient and generally impractical. This fact is well recognized in practice and competent authorities strongly advise against oil spraying (citrus trees for example) to control scale insects except under certain conditions and then only with very low concentrations (about ½%). The recommended practice for controlling insects on citrus trees is fumigation of the tree with hydrocyanic acid gas. Fumigation, however, has many disadvantages including uncertainty of control, and among others, citrus growers have for many years been seeking some method which can safely be relied upon to control scale insects on citrus trees, without grave danger to the trees themselves.

Emulsions of various lighter petroleum oils, or earlier fractions of mineral oil, have been the oils most generally tried for insecticidal purposes. Some of these oils do little, if any, damage to many plants but such oils have practically no insecticidal value. Others are moderately good insecticides but when their emulsions were concentrated enough to kill efficiently they produced injury to the tree.

I have discovered that all natural petroleums or fractions thereof contain dangerous amounts of phytocidal impurities and that the gasolines and kerosenes are generally less phytocidal than stove distillates and these in turn less phytocidal than lubricating oils; likewise that they are respectively of less insecticidal value. I have discovered that this less phytocidal property is chiefly due to the greater rapidity with which the phytocidal components of such lighter oils are evaporated and removed from the plant.

I have discovered that the insecticidal and phytocidal properties of oils are independent of each other and after many tests with a wide variety of oils variously applied extending over a period of twenty years, I have discovered that certain special oils may be obtained which have insecticidal properties of themselves and from which deleterious phytocidal impurities may be substantially removed and that oils so prepared and purified may be used with perfect safety if properly protected from contamination.

Believing that I was the first to conceive that an oil might possibly function at the same time as an effective insecticide and not substantially as a phytocide and the first to reduce such dual function to practice, I designate oils possessing said duel function generically as "phytonomic" oils.

More specifically I have discovered that contrary to common belief the substantial non-volatile viscous oils, when properly purified and substantially free from phytocidal ingredients, are phytonomic oils. By "viscous" I mean having sufficient resistance to flow to permit their forming films on the foliage, etc., and by "substantially non-volatile" I mean non-volatile enough to maintain this film when formed over or within the insect of sufficient thickness to be effective and to produce fatal results. "Substantially free from phytocidal ingredients" of course means that the concentration of the impurities in the oil shall be so small that it will be safe to expose the plant thereto, during the natural period of slow evaporation and absorption of the film.

By the expression "substantially free from unsaturated hydrocarbons" is meant containing less than about 15% thereof as indicated by the quantitative test described in Bureau of Mines, Technical Paper 181.

By substantially free from dissolved sulfur, I mean containing less than about 2/10% thereof as determined by the formation of copper sulfide. By substantially free from sulfonic acids and other sulfur compounds, I mean containing less than about 5/10% total sulfur as determined by combustion methods. By substantially free from fatty acids, I mean to exclude high percentages of ordinary oleic acid which is generally safe up to about 5%, but in general to exclude more than about 1% of the fatty acid-like bodies commonly found in petroleum distillates. The limits of the individual alcoholic bodies are less clearly known because the bodies are less clearly defined, but when I say substantially free of alcoholic bodies, I mean less than about 1% of the more important variety.

My discoveries have also led me to the belief that the phytocidal properties of oils are due to the presence of the following substances which I have succeeded in substantially removing and thereby substantially eliminating the phytocidal danger, viz: unsaturated hydrocarbons, sulphur, the more sensitive cyclic hydrocarbons, acids having organic nucleii, the more volatile bodies and other chemically active bodies.

Which of the above constituents are most phytocidal under specific circumstances I am not wholly prepared to state, but I have found the highly volatile constituents almost useless as insecticides and that a non-phytocidal oil may apparently be made phytocidal by the addition of sulphur and acids or oxidation products of the unsaturated or sensitive hydrocarbons.

I find that numerous factors affect the choice of oils or fraction of oils used and also the conditions of applying them. Among these factors are:

(1) *The kind of plant to be treated.*—Certain fruits and vines are very sensitive, whereas cabbages and some grasses are four or five times as resistant to the usual phytocidal impurities.

(2) *The condition of the plant iself.*—During the dormant season, or when well nourished and watered, most plants are from two to ten times as resistant as when ill nourished or in particularly active condition.

(3) *Weather conditions.*—Hot, dry weather increases the toxicity of phytocidal impurities during the period of actual contact with the plant, but hot, dry, windy weather also increases the rate of evaporation or substantial volatility of the oil itself and lessens the time of contact of such impurities as it may contain.

(4) *The viscosity of the oil itself.*—If too low it makes the oil difficult to film and disperse properly, but if too high, it may retard the spreading of the oil over the insect and the penetration into the breathing and digestive tracks unless the phytonomic oil is thinned with a less viscous diluent, generally a diluent of greater volatility.

(5) *The inherent volatility of the oil itself:* which partly determines for given weather conditions the time required to evaporate and therefore the time of contact between any impurities it may contain and the more tender portions of the plant. The oil itself however must be substantially non-volatile and remain in sufficient quantity to do its insecticidal work.

(6) *The relative volatility of the particular phytocidal impurities present in the oil.*—If sufficiently volatile they will evaporate more rapidly than the oil itself and may leave the phytonomic oil in sufficient purity to do its work undisturbed by possible injury to the plant.

(7) *The character of the emulsion applied.*—It may be so perfect and so stable that the oil itself, however impure, never comes into effective contact with either plant or parasite and is relatively safe even though ineffective. It was for this reason that authorities have hitherto strenuously urged the making of the most perfect emulsions possible, whereas I regard this extreme stability of the emulsions as unnecessary, if not undesirable.

(8) *The particular method of spraying.*— E. g. the pressure, diameter, formation of the nozzle and direction in which the spray is applied, all have much influence on the breaking of the emulsions and therefore upon the amount of oil actually contacting with the plant and the parasite.

(9) *The particular character of insect being controlled.*—Insects vary greatly in their sensitiveness as well as in the way in which their sensitiveness varies, or the particular stage of development, on the one hand, and also, on the other hand, sensitiveness of the particular part of the plant where its attack is being made and whereupon it must be controlled by direct spraying or by contact with the oil film already formed upon the plant.

In view of the teaching set forth herein all of the above conditions and variables may be understood and readily controlled by men experienced in the use of parasiticides and insecticides and such men will have no great difficulty in selecting by simple tests the materials having the desired properties for this specific use, it being preferable in each case to err on the side of greater purity from phytocidal materials than may at first sight seem necessary.

In its preferred form my phytonomic oil when prepared from petroleum generally exhibits substantially the following properties: It is colorless, transparent, has substantially no petroleum taste or odor at ordinary temperature; is practically non-drying or non-volatile at ordinary temperature; may range in gravity approximately between 27° B. (.8917 sp.g) to 43° B. (.8092 sp.g); and range in viscosity at 100° F. approximately between 50 and 350 sec. Saybolt. It does not react with concentrated sulphuric acid at ordinary temperature to any appreciable extent (coloring said acid only a light straw yellow); is practically free from sulphur (about 1/100% more or less); as a rule exhibits marked stability on distillation; and is either viscous or solid.

These properties or characteristics are in contrast with those of the great majority of other oils and particularly of other petroleum oils, both crude and refined, which may have color, odor, taste, smell, perceptible volatility, contain unsaturated bodies or highly reactive cyclic hydrocarbons, sulphur, and show decided reactivity with concentrated sulphuric acid.

My preferred phytonomic oil above described may be prepared from many crude petroleum oils by steam and fire distilling off of the lighter and more volatile portions from petroleum, separating a white oil stock of about the desired viscosity and purifying it as by treatment to sulfonation with fuming sulfuric acid, neutralization, steam distillation, and filtration, all or some of them being repeated if necessary till the above described product is reached.

For entirely different purposes, and hitherto unused in the art of plant protection or anything analogous thereto there have been oils on the market which may function as phytonomic oils in practicing my invention. Two of these are known, respectively, in commerce under the names "Wyrol" and "Oronite crystal oil."

In order to use oils economically in spraying plants, they must be diluted with water or some other neutral carrier. As oils are not soluble in water, it is necessary to emulsify them with some agent which will allow a uniform mixture of oil and water to take place. Such emulsions have commonly in the past been made by dissolving the usual petroleum oils in creosote soaps to make "miscible oils" and then mixing these with water, although they could be and sometimes were prepared with other organic colloids, such as glues, gums and casein. I have discovered that some soaps, particularly the creosotic soaps, are injurious to plants, and I prefer to prepare the emulsion with the use of clean organic colloids and by mechanical dispersion. Also I have discovered that minute quantities of certain impurities, such as sulphur in certain forms, may enter with the emulsifying agent, or the water, and produce unexpected injury to the plants.

I have found that the method of preparing the emulsion, the chemical constitution of the oil components, as well as small quantities of certain impurities in either the oil, the water, or the emulsifying agent applied to, have been largely responsible for the hitherto unreliable results.

I have prepared emulsions of these phytonomic oils, both liquid and solid at ordinary temperatures, with water and organic colloids and have applied them to growing citrus trees, including orange, lemon and grapefruit trees, in concentrations up to ten per cent actual phytonomic oil content, without injury to the tree. In such applications the young, egg and adult stages of all varieties of scale were killed and in other tests using less than the maximum dosage a complete kill was effected.

To increase the distribution and penetrating power of the non-volatile phytonomic oils which may be either liquid or solid by themselves at ordinary temperatures, I have diluted these oils with various proportions relatively volatile diluent or spreading oils, such as kerosene, with excellent results. Because these volatile diluent oils are by themselves practically useless, I believe them to act chiefly, if not wholly, as a spreading or penetrating agent for the phytonomic oils. While I prefer to have them also carefully freed from phytocidal impurities, I believe that most of such impurities as naturally occur therein are more volatile and less harmful than those naturally accompanying the stock from which I have prepared the phytonomic oils. Experiments with emulsions of such mixtures have shown that ten per cent of a mixture containing one part of the phytonomic oil and two parts of kerosene is equal in killing power to an emulsion containing six per cent of the pure phytonomic oil. From what has been said above, it will be apparent that the same degree of purity from reactive bodies required of the insecticidal constituent is not essential to the more volatile diluent oil used as a distributing agent, but I prefer to use a good pure grade, such as the Eocene described later.

The better to explain certain features of my invention, I will give detailed descriptions of a few specific embodiments of certain features thereof. These are given by way of example and illustration and not intended to confine the invention thereto as many modifications of the invention can in fact be made by addition, subtraction, substitution, or otherwise, so long as the substance of any one or more of the claims is taken and availed of for the protection of plant life and the control or destruction of plant parasites In carrying out my invention in practice I have proceeded as follows with successful results:

*Example I.*—I have taken a fresh, colorless, odorless and tasteless sample of "Wyrol" oil and applied it to young shoots of fruit trees, such as peach, apple, pear or plum trees, by spraying it directly onto the stem and foliage with an ordinary fine-spray paint gun using compressed air at about 40 pounds per square inch pressure to insure a fine spray and applying the oil until the modified appearance of leaves and stems indicated the presence of a minute film of oil almost covering the surface. Without taking any further precaution for either protection of the plant or destruction of insect life I have found substantially no injurious effect to either foliage or plant growth but the practically complete killing of aphis, scale, caterpillar eggs, etc.

This procedure will serve in many cases to ascertain whether a new and untried oil submitted for consideration can with safety be applied in one of the emulsion forms of my invention to an entire tree by ordinary workmen and be substantially free from phytocidal action, and this is one of the most rigid tests I apply in the preliminary testing of oils that are intended to be used to embody one or more of the other forms of my invention.

In carrying out my invention in practice I have also proceeded as follows with successful results:

*Example II.*—I have prepared a mixture of the following:

1000 gallons Oronite crystal oil
2000 gallons Eocene
1000 gallons water
  40 pounds dried sulphite-pulp waste-liquor.

This mixture was emulsified by agitating and pumping through suitable orifices under high pressure. It was then ready for placing in barrels for sale and shipment. Before use it was diluted with from seven to fifty times its volume of water, preferably about twelve times. It was then sprayed on citrus trees without injury to the trees. In many cases removal of scale has been practically one hundred per cent complete by careful spraying. In this case color, odor and taste are to some extent acquired by the emulsion from the dried liquor without substantial detriment to its safety or insecticidal qualities. The oil retains some of this color on drying. The liquor is used as a cheap form of a colloid or other agent adapted to stabilize the dispersion or emulsion of the oils in the water.

In carrying out my invention in practice I have also proceeded as follows with successful results:

*Example III.*—I have taken twelve gallons of the concentarted emulsion first prepared, as in Example II, except that it was made with a good neutral grade of British gum or yellow dextrin in a regular emulsifier. Instead of diluting the same with plain water I have diluted with eighty-five gallons of regular spray suspension of triplumbic ortho arsenate containing two pounds of lead arsenate powder, keeping it in good suspension until sprayed. Spraying was done in the morning of a clear day in early summer to permit the emulsion to dry well, and the oil to spread the arsenate coating. No injury to foliage resulted. Soft insects were killed almost at once. Sucking insects that would not have suffered from the lead arsenate were killed by the oil in about ten to twenty days, and the eggs of other insects generally failed to hatch. Such chewing insects as did hatch out, or come from elsewhere, found an unusually adherent and evenly distributed coating of arsenate of lead which the oil had helped to prevent from washing off by rain or heavy dew and which soon proved fatal to them. The indications are that one such summer spraying gerenally applied throughout a district will serve to control insect pests throughout the year.

The "Wyrol" and "Oronite crystal" oils above referred to, are the commercial articles known to men skilled in the art under those names and among the equivalent thereof I have employed "Nujol" or "Markol". In all of these I believe the dominating ingredients to be saturated petroleum constituents from which have been separated ingredients unsaturated, volatile and having a decided affinity for concentrated, sulfuric acid. I am also of the belief that pure saturated paraffines may be equivalents, and perhaps certain pure cyclic petroleum constituents.

The oils referred to in the preceding paragraph have the following well recognized characteristics:

|  | Markol | Wyrol | Nujol | Crystal oronite |
|---|---|---|---|---|
| Specific gravity | .835–.840 | .880–.885 | .880–.885 | .860–.870 |
| Saybolt viscosity at 100° F | 70–75 | 120–130 | 210–220 | 100–110 |

The "Eocene" above referred to, is the commercial article known to men skilled in the art under that name, the dominating ingredient of which is purified kerosene.

It is possible to color, odorize and give a decided taste to petrolatum, phytonomic oils, or to suitable oils having substantially the characteristics of viscous water white mineral oils, without rendering them toxic to plants and the addition of any material or materials to the group of phytonomic oils to disguise the nature of the oil employed, or distinguish one brand or kind from another, etc. is within the purview of my invention.

Also other oils have been used with success, such as "Markol", that did not fully comply with all of the guiding properties given to aid in the selection of the safest and therefore preferred oils to be used. In describing the oils therefore as phytonomic oils, I use the expression as typical of oils sufficiently free from reactive bodies of various kinds to permit their safe use under my invention, and do not use the expression "phytonomic oils" as limited to the class that may now or at some future time be described as white oils, petrolatums and vaselines in commerce. In fact certain water white oils and certain so-called petrolatums are practically useless by themselves, or positively injurious.

Further, other economic poisons, such as fungicides and insecticides for destroying animal or vegetable parasites beside arsenate of lead, may be mixed with the emulsion of my invention to combat other pests infesting the trees, provided only that phytocidal impurities are not thereby added or produced.

This is a continuation in part of my application, Serial No. 663,486, filed September 18, 1923.

Having therefore described in great detail the new method of controlling plant insects without danger to the plant, the methods of preparing and the typical properties of a new class of oils not hitherto recognized or known to be either phytonomic or insecticidal, so far as I am aware, having specifically indicated certain medicinal and other oils which chance to fulfill these requirements, and exemplified the use and application of phytonomic oils as emulsions for spraying purposes, both alone and in combination with a suitable inert example of a positive insect poison, I do not intend to limit my invention to any particular method of preparing this class of oils or to oils exhibiting all the typical properties or to particular emulsifiers or methods of emulsification, or to particular concentrations, or diluents, or cooperative poisons.

I claim:

1. An insecticide comprising a spray containing a substantially non-volatile viscous oil substantially free from phytocidal ingredients.

2. An insecticide comprising a spray of water containing a substantially non-volatile viscous mineral oil substantially free from phytocidal ingredients.

3. An insecticide comprising an emulsion of a substantially non-volatile viscous oil substantially free from phytocidal ingredients in one-third of its weight or more of water and an agent adapted to stabilize the emulsion.

4. An insecticide comprising a substantially non-volatile viscous mineral oil substantially free from phytocidal ingredients diluted with a purified organic diluent of greater volatility.

5. An insecticide comprising a substantially non-volatile viscous mineral oil substantially free from phytocidal ingredients combined with an economic poison.

6. The process of manufacturing insecticides which consists of dispersing a substantially non-volatile, viscous oil, substantially free from phytocidal ingredients, in one-third or more of its volume of an inert fluid.

7. The process of manufacturing insecticides which consists of dispersing a substantially non-volatile, viscous oil, substantially free from phytocidal ingredients, in a substantially pure organic solvent and dispersing this solution in one-third or more of its volume of an inert fluid.

8. A parasiticide comprising an aqueous dispersion of substantially non-volatile oil substantially free from phytocidal ingredients.

9. A parasiticide comprising an aqueous dispersion of a substantially non-volatile viscous oil substantially free from phytocidal impurities containing a purified organic diluent of greater volatility.

10. A compound of the character described comprising water and a substantially non-volatile viscous oil the essential character of the mixture being that it can safely be applied to growing insect-infested plants in oil concentrations sufficient to produce a substantially complete oil film on the foliage and effect a substantially complete kill of the insects.

11. An insecticidal spray comprising water and an oil emulsified therein, characterized by the fact that the oil is non-volatile, viscous and contains not more than fifteen percent of unsaturated hydrocarbons, as indicated by the herein described quantitative test.

12. An insecticidal spray comprising water and an oil emulsified therein, characterized by the fact that the oil is non-volatile, viscous and contains not more than fifteen percent of unsaturated hydrocarbons, and not more than two-tenths of one percent of dissolved sulfur.

13. An insecticidal spray comprising water and an oil emulsified therein, characterized by the fact that the oil is non-volatile, viscous and contains not more than fifteen percent of unsaturated hydrocarbons, not more than two-tenths of one percent of dissolved sulfur, and not more than one-half of one percent of total free and combined sulfur.

14. An insecticidal spray comprising water and an oil emulsified therein, characterized by the fact that the oil is non-volatile, viscous and contains not more than fifteen percent of unsaturated hydrocarbons, not more than two-tenths of one percent of dissolved sulfur, not more than one-half of one percent of total free and combined sulfur, and not more than about one percent of fatty acids other than oleic acid.

15. An insecticidal spray comprising water and an oil emulsified therein, characterized by the fact that the oil is non-volatile, viscous and contains not more than fifteen percent of unsaturated hydrocarbons, not more than two-tenths of one percent of dissolved sulfur, not more than one-half of one percent of total free and combined sulfur, not more than about one percent of fatty acids other than oleic acid, and substantially free from higher alcohols as herein described.

16. The process of treating plants infested with parasites, which consists in exposing them to an aqueous spray containing a viscous, non-volatile oil substantially free from phytocidal impurities.

17. The improvement in the process of treating plants infested with parasites by means of oil sprays, under seasonal and other conditions, in which the use of substantially non-volatile oil has been found injurious to the plants, which consists in exposing them to an aqueous spray containing a viscous non-volatile oil substantially free from phytocidal impurities.

WILLIAM HUNTER VOLCK.